US005840142A

United States Patent [19]
Stevenson et al.

[11] Patent Number: 5,840,142
[45] Date of Patent: Nov. 24, 1998

[54] DECORATION AND PRINTING ON POLYOLEFIN SURFACES

[76] Inventors: Michael J. Stevenson, 1200 Soldier Pass Rd., Sedona, Ariz. 86336; Robert A. Reeves, 845 Oasis Dr., Cottonwood, Ariz. 86326; Matthew P. Stevenson, 385 Ross Rd., Sedona, Ariz. 86336

[21] Appl. No.: 754,159

[22] Filed: Nov. 22, 1996

[51] Int. Cl.[6] .............................. B32B 31/00; B44C 1/17; B05D 3/06; B05D 3/08

[52] U.S. Cl. ........................ 156/237; 156/272.2; 156/277; 427/224; 427/258; 427/375; 427/393.5; 427/559

[58] Field of Search ..................................... 156/235, 237, 156/239, 240, 277, 272.2; 427/224, 375, 393.5, 412.3, 416, 559, 258; 101/34, 487, 492

[56] References Cited

U.S. PATENT DOCUMENTS

| | | | |
|---|---|---|---|
| 3,567,571 | 3/1971 | Martinovich | 156/240 X |
| 3,616,015 | 10/1971 | Kingston | 156/240 X |
| 3,974,014 | 8/1976 | Meisner et al. | 156/240 |
| 4,235,657 | 11/1980 | Greenman et al. | 156/240 X |
| 4,536,434 | 8/1985 | Magnotta | 156/230 X |

*Primary Examiner*—Curtis Mayes
*Attorney, Agent, or Firm*—Robert E. Strauss

[57] ABSTRACT

There is disclosed a method for the permanent application of indicia to the surface of the polyolefin object by applying pigmented material to the surface in an indica pattern, preferably from a transfer sheet. Preferably the pigmented material is a mixture of finely divided pigment, hydrocarbon wax and finely divided polyolefin. The polyolefin surface bearing the indicia is coated with a coating mixture comprising a mixture of polyolefin and a binder such as a rosin or wax. Thereafter, the coated, indicia-bearing polyolefin surface is surface-heated to a temperature sufficient to fuse the coating and incorporate the coating and indicia permanently into the polyolefin object. The heating can be performed by passing a heat source across the surface.

11 Claims, 2 Drawing Sheets

DECORATION AND PRINTING ON POLYOLEFIN SURFACES

BACKGROUND OF THE INVENTION

1. Field of Invention

This invention relates to the decoration or printing of a polyolefin surface, and in particular for a method for permanently imparting indicia to the surface of a polyolefin object.

2. Brief Statement of the Prior Art

Polyolefin surfaces and, in particular, polyethylene surfaces are very non-receptive to coatings such as paints, inks and the like. Consequently, it is very difficult to impart a permanent indicia, either decoration or printed matter, on the surface of a polyolefin object. Various techniques have been attempted such as flame treatment to condition or partially oxidize the surface of the polyolefin object is partially oxidized to render it receptive to a pigmented coating materials such as inks or paints.

In U.S. Pat. 4,252,762 and 4,519,972, methods are disclosed for imprinting or decorating the surface of rotationally molded products. The methods comprise coating the interior surfaces of the rotational mold with a suspension of a pigment in an oil or wax, followed by an otherwise conventional rotational molding operation. While these patented methods achieve a permanent bonding of paints or inks to a polyolefin object, it is frequently desirable to apply graphics or printing to polyolefin objects after their formation.

OBJECTIVES OF THE INVENTION

It is an objective of this invention to provide a method for application of indicia to the surface of a polyolefin object.

It is a further objective of the invention to provide a method for the permanent application of indicia to the surface of a polyolefin object.

It is likewise an objective of this invention to provide a method for protection of indica on the surface of a polyolefin against abrasion or chemical deterioration.

It is also an objection of this invention to provide a method whereby indicia are bonded into a polyolefin object.

It is an additional objective of this invention to provide an efficient method for application of indicia to the surface of a polyolefin object after its manufacture.

Other and related objectives will be apparent from the following description of the invention.

BRIEF DESCRIPTION OF THE INVENTION

This invention comprises a method for the permanent application of indicia to the surface of the polyolefin object by applying pigmented material to the surface in an indicia pattern, preferably from a transfer sheet. Preferably the pigmented material is a mixture of finely divided pigment, hydrocarbon wax and finely divided polyolefin. The polyolefin surface bearing the indicia is coated with a coating mixture comprising a mixture of polyolefin and a binder such as a tackifier resin, rosin or wax. Thereafter, the coated, indicia-bearing polyolefin surface is surface-heated to a temperature sufficient to fuse the coating and incorporate the coating and indicia permanently into the polyolefin object. The heating can be performed by passing a heat source across the surface.

BRIEF DESCRIPTION OF THE DRAWINGS

The invention will be described with reference to the figures of which.

DESCRIPTION OF THE PREFERRED EMBODIMENT

Figure 1:
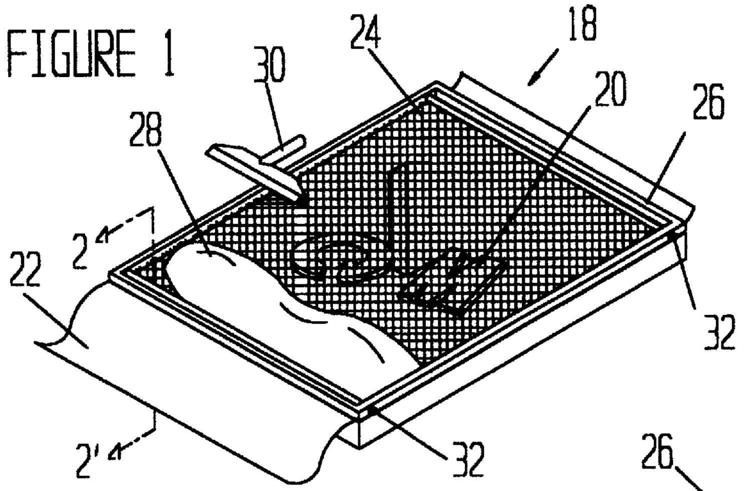
FIG. 1 illustrates the step of silk screen printing of a reverse image of indicia to be applied to the polyolefin object.

The invention comprises the application of a pigmented material in a decorative or printed pattern, i.e. indicia, to a selected surface of a polyolefin object. The indicia material comprises a physical mixture of a pigment, polyolefin and wax with minor amounts of other components such as fillers, viscosity additives, and the like.

The hydrocarbon wax is preferably a transparent or light colored wax which will not contribute any coloration or shading to the indicia. Examples of suitable waxes include paraffin wax, synthetic wax, microcrystalline wax, and plastic wax. A very suitable wax is a microcrystalline wax having a melting point from 90 to 300 degrees F., preferably from 110 to 250 degrees F., and a molecular weight from 500 to 1000, preferably from 600 to 750. Microcrystalline waxes are refined petroleum waxes that have been crystallized from solvents used to extract wax from highly paraffinic petroleum stocks.

Plastic waxes are less refined and contain branched chain and naphthionic hydrocarbons. Typically, plastic waxes have hardness values and crystalinity less than those of microcrystalline waxes.

Paraffin wax comprises chiefly n-paraffin hydrocarbons having from 16 to 38 carbons with limited quantities of branched chain paraffins, monocyclic and polycyclic paraffins.

Synthetic hydrocarbon waxes are obtained by the polymerization of hydrocarbon olefins such as ethylene, propylene, propylene and copolymerization of these monomers. Typically, these synthetic waxes have molecular weights from 400 to about 3,000 with a narrow molecular weight distribution.

The wax should have a melting point of from between 100 and 250 degrees F. Various additives can be incorporated in the wax in minor quantities to improve the flexibility of the wax and these include polybutadiene, poly styrene butadiene, butyl resins, polyterpene resins, rosins, and aliphatic and aromatic hydrocarbons. These additives can be used in minor quantities from about 0.5 to 20 weight percent of the wax.

The polyolefin used in the pigmented material has a finely subdivided or powdered state with a particle size from less than 1 micron to about 120 microns maximum particle diameter. Typical densities of such powders range from about 0.86 to 0.97 grams per cubic centimeter. Examples of suitable polyolefins include low, high and linear low density polyethylene, polypropylene, ethylene/vinyl acetate copolymers, ultra high molecular weight polyethylene and metallocene catalyst polyolefins.

Various colorants can also be used as the pigment. Colorants which are useful include those containing inorganic pigments such as titanium dioxides (rutile, anatase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide (lithopones), cadmium mercury mixtures, cadmium sulfide or cadmium sulfoselenides, nickel and titanium dioxide mixtures, sodium, potassium or ammonium coordination compounds of ferri-ferrocyanide, ultramarine blues (a calcined mixture of china clay, sodium carbonate, silica, sulfur and reducing agents), cobalt aluminate (cobalt blues), chromium oxide, metal flake pigments such as aluminum, zinc, copper, bronze powders, metal silver pigments, pearlescent and iridescent flakes of basic lead carbonates, bismuth oxychlorides and titanium coated mica, etc. Various organic pigments which are useful include azo pigments, such as benzimidazolone pigments, pyrazolone pigments, copper phthalocyanine, quinacridones, anthraquinones, condensation pigments, tetra-chloro-isoindolinones, carbon blacks, etc.

The ingredients should be intimately admixed and blended in a mixer suitable for mixing solids into heated, viscous liquids. Examples of various mixing equipment which can be used includes kneaders, double motion paddle mixers, rotating pan mixers, pug mills, colloid mills, votators, and roller mills. The mixing and blending can be performed continuously or batchwise, depending on the selection of the particular mixing equipment. Generally, mixing equipment which provides a high shearing action is most desirable to achieve an intimate admixture of the solids in the liquid phase.

The equipment applies sufficient shear to the mixture to disperse any pigment or polyolefin agglomerates throughout the liquid (wax) phase. The wax is melted and introduced into the mill which is held at a temperature above the melting point of the wax throughout the mixing step.

It has been found that a very useful material for the silk screen printing of the indicia comprises a mixture from 30 to 60 percent wax, 30 to 60 weight percent polyolefin and 10 to 50 weight percent of pigments and optional additives such as fillers, e.g., silica, silicates, glass bubbles, etc., as desired to provide the optimum viscosity of the final blend for use in the printing step. A preferred material comprises a mixture of from 20 to 35 weight percent finely divided pigment, 50 to 60 weight percent hydrocarbon wax, and 20 to 30 weight percent finely divided polyolefin.

The pigmented material is formed into an indicia pattern by various methods. Preferably a silk screening printing step is used because this method provides close control over the resolution of the indicia, ensuring sharp or crisp indicia for application to the surface of the polyolefin object.

FIG. 1 illustrates silk screen printing equipment 18 on which the printing process can be practiced to deposit a reverse image of the indicia onto a flexible transfer sheet 22. The transfer sheet 22 can be a flexible sheet or film of various materials such as paper, plastic, e.g., films of polyethylene, polypropylene, polyvinyl acetate, cellulose acetate, etc., having a thickness of from about 2 to about 20 mils. Preferably, a non-woven sheet material such as parchment paper is used because of its dimensional and thermal stability, flexibility and availability. Prior to use, the transfer sheet 22 can be coated with a release agent such as a conventional silicon release agent to facilitate subsequent transfer of the indicia to the polyolefin object.

Silk screen printing is an example of a stencil printing of the indicia onto the surface of the transfer sheet 22. In the conventional silk screen printing, one or a plurality of silk screens 24 are mounted in support frames 26 and sequentially used to impart a reverse image of the indicia onto the transfer sheet 22. In a typical application, silk screens having a mesh from 100 to 600, preferably 200 to 450 are used and are photographically processed in the conventional manner to obtain a stencil 20 the desired indicia for printing on the transfer sheet 22. The pigmented material 28 is applied to the top surface of the silk screen 24 which is positioned in registered alignment over the surface of the transfer sheet 22 and a squeegee 30 or other tool is used to distribute the pigmented material across the surface of the screen 24, forcing it through the open weave of the screen 24, depositing a reverse image of the indicia onto the transfer sheet 22.

Figure 2:
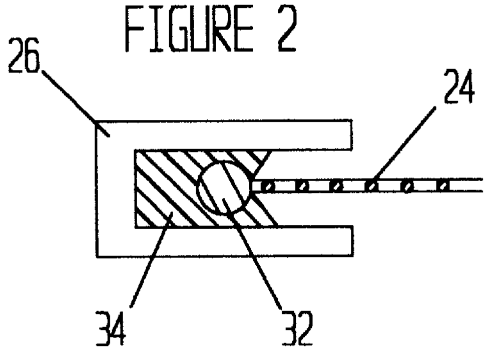
FIG. 2 is a view along line 2-2' of FIG. 1.

Preferably, the silk screening step is practiced with the pigmented material in a hot, molten condition, typically at a temperature above about 104° F. The pigmented material can be maintained at the recited temperature with the use of electrically heated metallic screens. In this application, the screen is formed of metallic, preferably stainless steel wire which is extended between electrodes 32 (see FIG. 2 ) located at opposite ends of the silk screen. The electrodes 32 are maintained in physical and electrical contact with the metal wires of the silk screen 24 permitting electrical current to be passed between the electrodes 32, heating the screen and maintaining it at a temperature above the melting point of the wax in the pigmented material. As shown in FIG. 2, the electrodes 32 and metallic screen 24 are maintained out of physical and electrical contact with the support frame 26 by various insulators 34.

The reverse image of the indicia is coated on the surface of transfer sheet 22 using one or several screens for imprinting of the indicia. When the image is monochromatic, a single screen 24 is used whereas, when the indicia is of two or more colors, a plurality of stencil screens are used to obtain the desired color pattern in the indicia image on the transfer sheet carrier.

Figure 3:
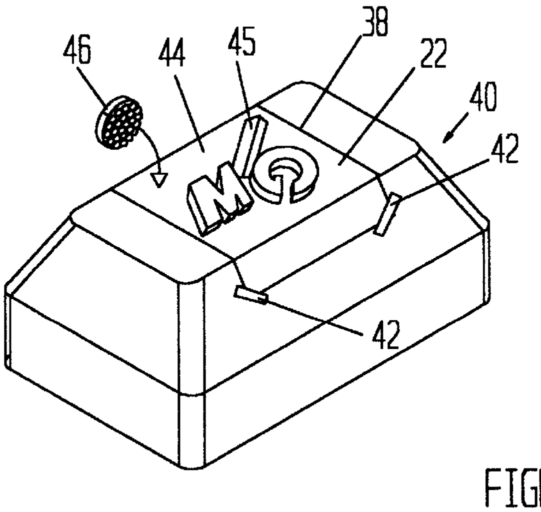
FIG. 3 illustrates the transfer of the indicia from the transfer sheet to the polyolefin object.

The transfer sheet 22 is then applied to a selected surface of the polyolefin object 40 in a manner illustrated in FIG. 3. As there illustrated, the transfer sheet 22 has been applied with the indicia side against an area 38 on the top of the polyolefin object 40 which is to be decorated or imprinted with the indicia 45, which is shown in broken lines, as it is on the underside of the sheet 22 in FIG. 3. The polyolefin object 40 in FIG. 3 could be an illuminated sign for an exterior location and one or more of its sides could be covered with indica.

In this application, the transfer sheet 22 is placed across the area 38 of the polyolefin object 40 and secured by pressure sensitive tape 42. The transfer sheet 22 is applied to the surface of the polyolefin object 40 with its image-bearing side against the surface of the polyolefin object 40. The user then transfers the indicia 45 from the film carrier to the surface of the polyolefin object by the application of compression to the exposed, top surface 44 of the transfer sheet 22. This can be accomplished by use of a burnishing tool 46 which can comprise a flat pad that supports a plurality of steel ball bearings. The burnishing tool 46 is rubbed across the exposed top surface 44 of the transfer sheet 22, pressing the indicia against the surface of the polyolefin object 40 and effecting its transfer from the transfer sheet 22 to the polyolefin object 40.

Figure 4:
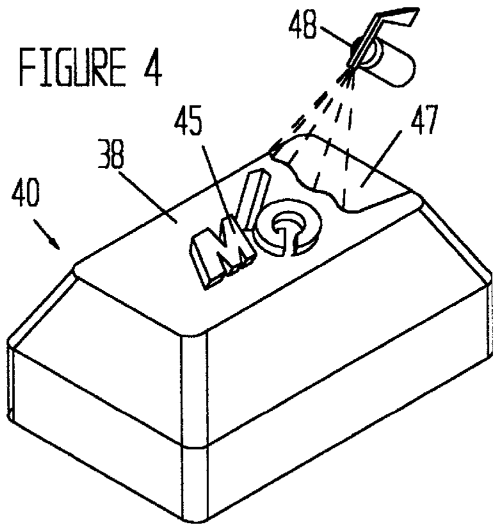
FIG. 4 illustrates application of the coating material to the indicia bearing surface of the polyolefin object.

After transferring of the indicia to the surface of the polyolefin object, the transfer sheet 22 is removed and the indicia bearing area 38 on the surface of the polyolefin object 40 is coated with a protective layer. This layer is formed of a coating material that comprises a mixture of from 1 to 99 weight percent polyolefin and a from 1 to 10 weight percent binder selected from the group consisting of rosins, aromatic and aliphatic hydrocarbon resins and waxes and terpene base resins. The coating can be applied as a liquid with the aforementioned components dispersed, dissolved or suspended in a suitable volatile solvent. As shown in FIG. 4, the coating can be applied to the indicia bearing area 38 of the polyolefin object 40 as a protective layer 47 by use of an aerosol, airless or compressed air spray gun 48. Alternatively, the coating can be brushed or rolled onto the indicia bearing area. Preferably, the coating is applied to a thickness from about 0.25 to about 3 mils thickness. After application the coating is permitted to dry by the release of the volatile solvent, leaving a mixture of the polyolefin powder and tackifying resin incorporated with the indicia 45 on the indicia-bearing surface 38 of the polyolefin object 40.

Figure 5:
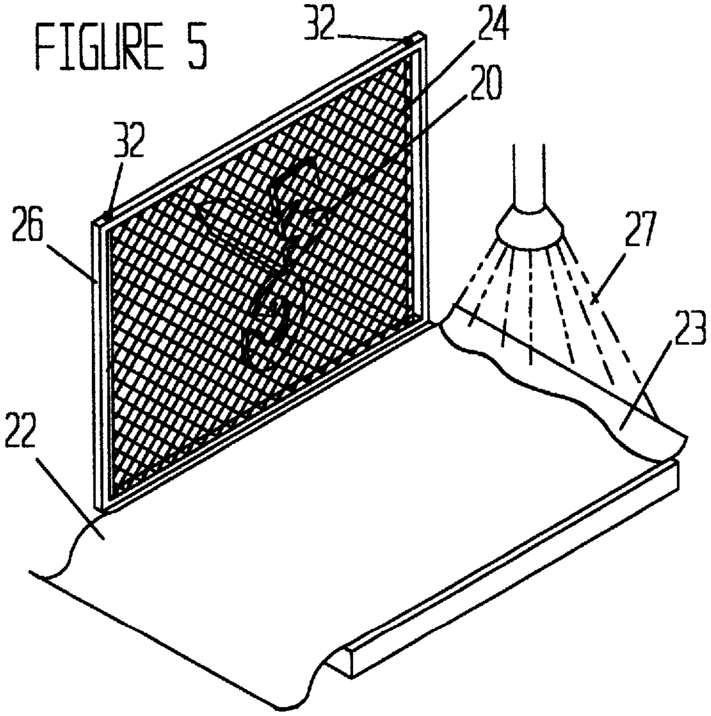
FIG. 5 illustrates application of the coating material to the transfer sheet used in the invention.

As an alternative to the application of the coating material directly onto the indicia-bearing area 38 of the surface of the polyolefin object 40, the coating material can be incorporated on the transfer sheet 22 as the first step in the silk screen printing of a reverse image 20 of the indicia on the flexible transfer sheet 22. This is shown in FIG. 5 in which the transfer sheet 22 is sprayed with the coating material 27 to form a layer 23 of the coating material on the surface of the sheet 22, before the screens 24 are used to apply the indica to the sheet. The subsequent compression by burnishing of the film carrier on the surface of the polyolefin object will also transfer the layer 23 of the coating material from the transfer sheet 22 to the indicia bearing area 38 of the surface of the polyolefin object 40, forming a protective layer over the indicia 45.

Figure 6:
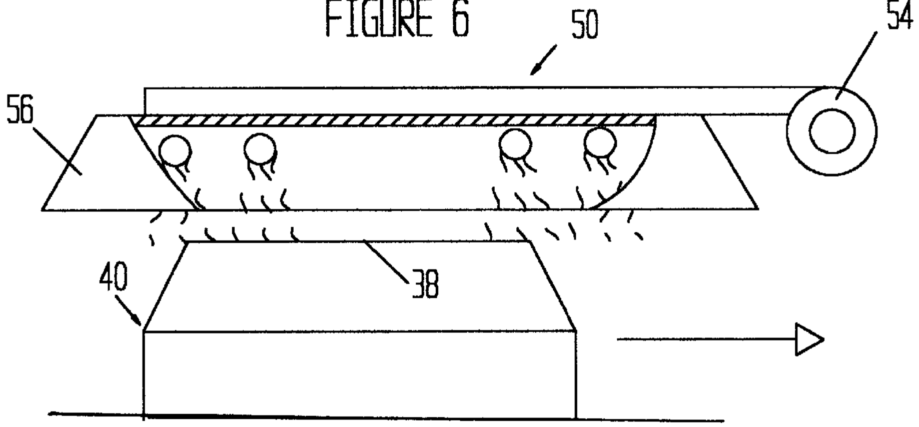
FIG. 6 illustrates the heating of the coated, indicia-bearing surface of the polyolefin object.

The polyolefin object is then subjected to a high temperature surface heating using a suitable radiant source such as an open flame or a high temperature electrical heater. As shown in FIG. 6, this can be accomplished by passing the polyolefin object 40 beneath an infrared heater 50 formed of a plurality of high temperature resistant heaters 52, e.g., calrods and the like. The infrared radiation transfers heat to the indicia-bearing area 38 on the surface of the polyolefin object 40, and this heat transfer can be augmented by forced air circulation with a blower 54 and containment hood 56 illustrated in FIG. 6.

During the surface heating of the polyolefin object 40, heat is applied in an intermittent fashion to heat only the surface of the polyolefin object 40 sufficiently to fuse the protective layer 47 of the coating material and pigmented material of the indicia 45 into the surface of the polyolefin object 40. In a production line heater 50 shown in FIG. 6, the intermittent application of heat can be controlled by individual control of electrical power to each of the heaters 52, which can also be spaced apart, as shown in FIG. 6 to provide interrupted heat application as the object is moved through the heating zone.

Care should be taken in the heating step to avoid excessive heating which could cause thermal distortion or degradation of the polyolefin object 40.

The coating and indicia and the surface of the polyolefin object are heated until a smooth clear surface can be observed on the area 38 of the surface of the polyolefin object, indicating that the coating and indicia have been incorporated into the polyolefin object, into the surface thereof. Thereafter, the polyolefin object is cooled to ambient or room temperature.

Once cooled to ambient temperature, it will be observed that the polyolefin object has acquired a permanent indicia 45 that is embedded into its exterior surface and sealed with a protective coating from external conditions such as harsh chemical environments, abrasion and the like.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. The method for the permanent application of indicia to a surface of a polyolefin object which comprises:

a. applying indicia formed of a mixture of finely divided polyolefin, pigment and wax to said surface to provide an indicia-bearing area thereof;

b. providing a coating over said indicia-bearing area of a coating mixture consisting essentially of from 1 to 99 weight percent polyolefin and the remaining weight percent being a binder selected from the group consisting of rosins, aromatic and aliphatic hydrocarbon resins and waxes, and terpene base resins to obtain a coated, indicia-bearing area;

c. heating the coated, indicia-bearing area by exposing the surface of said polyolefin object to atmospheric pressure heating at a temperature sufficient to fuse said coating and incorporate said coating and said indicia permanently into said surface.

2. The method of claim 1 wherein said polyolefin object is a polyethylene object.

3. The method of claim 2 wherein said step of heating comprises surface heating of said polyethylene object by the intermittent application of heat thereto at spaced time intervals sufficient to avoid thermal distortion of said object.

4. The method of claim 3 wherein said heating is performed by passing a flame across said surface.

5. The method of claim 3 wherein said heating is performed by infrared radiation from a high temperature source.

6. The method of claim 3 wherein said indicia mixture comprises a mixture of from 20 to 35 weight percent finely divided pigment, 50 to 60 weight percent hydrocarbon wax, and 20 to 30 weight percent finely divided polyethylene.

7. The method of claim 3 wherein said indicia mixture comprises a mixture of from 10 to 50 weight percent finely divided pigment, 30 to 60 weight percent hydrocarbon wax, and 30 to 60 weight percent finely divided polyethylene.

8. The method of claim 2 wherein said indicia is applied to said area of the surface of said polyethylene object from a transfer sheet by the application of the transfer sheet bearing said indicia onto said area and compressing said indicia against said area to transfer said indicia from said sheet to said area, and removing said sheet from said surface, leaving said indicia deposited thereon.

9. The method of claim 8 wherein said compression of said indicia is performed by rubbing against said sheet.

10. The method of claim 9 wherein said rubbing is performed with a burnishing tool.

11. The method of claim 8 including the preparation of said transfer sheet by the silk screen printing of a reverse image of said indicia onto a flexible sheet material.

* * * * *